United States Patent
Kimura et al.

(10) Patent No.: US 11,721,959 B2
(45) Date of Patent: Aug. 8, 2023

(54) PROTECTOR

(71) Applicant: Yazaki Corporation, Tokyo (JP)

(72) Inventors: Akitoshi Kimura, Aichi (JP); Masayoshi Ogawa, Aichi (JP); Kazuya Takahashi, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/872,314

(22) Filed: Jul. 25, 2022

(65) Prior Publication Data
US 2023/0036381 A1 Feb. 2, 2023

(30) Foreign Application Priority Data
Jul. 27, 2021 (JP) .................................. 2021-122108

(51) Int. Cl.
*H02G 3/04* (2006.01)
*B60R 16/02* (2006.01)

(52) U.S. Cl.
CPC ....... *H02G 3/0418* (2013.01); *B60R 16/0215* (2013.01); *H02G 3/0487* (2013.01)

(58) Field of Classification Search
CPC .................................................. H02G 3/0487
See application file for complete search history.

(56) References Cited

U.S. PATENT DOCUMENTS

| | | | | |
|---|---|---|---|---|
| 5,739,470 A | * | 4/1998 | Takeda | H02G 3/0487 174/101 |
| 6,087,593 A | * | 7/2000 | Skipworth | H02G 11/00 174/136 |
| 6,861,589 B2 | * | 3/2005 | Katsumata | E05D 11/0081 174/101 |
| 2005/0045361 A1 | * | 3/2005 | Arai | B60R 16/0215 174/72 A |
| 2005/0217888 A1 | * | 10/2005 | Arai | H02G 3/0418 174/72 A |
| 2015/0294768 A1 | * | 10/2015 | Sakaki | H01B 13/012 174/72 A |
| 2016/0171129 A1 | * | 6/2016 | Nakamura | G06F 30/00 703/1 |

(Continued)

FOREIGN PATENT DOCUMENTS

| | | | | |
|---|---|---|---|---|
| CN | 103779814 A | * | 5/2014 | ......... H02G 3/0418 |
| DE | 102018217839 A1 | * | 4/2019 | ........ B60R 16/0215 |

(Continued)

*Primary Examiner* — Krystal Robinson
(74) *Attorney, Agent, or Firm* — Sughrue Mion, PLLC (57) ABSTRACT

A protector includes a protector body, a lid member, and an engagement mechanism. The lid member has a ceiling and a protrusion. When a first wiring member and a second wiring member are accommodated in an accommodating space in a non-regular arrangement in which a peripheral surface of the first wiring member contacts a bottom and a peripheral surface of the second wiring member contacts the peripheral surface of the first wiring member, the peripheral surface of the second wiring member contacts the protrusion on the way of the transition of the engagement mechanism from a non-engagement state to an engagement state. When accommodated in a regular arrangement, the engagement mechanism transitions from the non-engagement state to the engagement state.

12 Claims, 3 Drawing Sheets

(56) References Cited

U.S. PATENT DOCUMENTS

| | | | |
|---|---|---|---|
| 2018/0278033 A1* | 9/2018 | Yamao | H02G 3/0418 |
| 2021/0016727 A1 | 1/2021 | Kimura et al. | |
| 2021/0273433 A1* | 9/2021 | Aimu | B60R 16/0215 |

FOREIGN PATENT DOCUMENTS

| | | | | |
|---|---|---|---|---|
| EP | 1186925 A1 * | 3/2002 | | G02B 6/4459 |
| JP | 2021-19424 A | 2/2021 | | |
| WO | WO-2018135392 A1 * | 7/2018 | | B60R 16/0215 |

* cited by examiner

PROTECTOR

CROSS-REFERENCE TO RELATED APPLICATION(S)

The present application claims priority to and incorporates by reference the entire contents of Japanese Patent Application No. 2021-122108 filed in Japan on Jul. 27, 2021.

BACKGROUND OF THE INVENTION

1. Field of the Invention

The present invention relates to a protector.

2. Description of the Related Art

A vehicle such as an automobile includes a wire harness that mutually connects various devices in the vehicle. Such a wire harness includes a protector that protects a wiring member constituting the wire harness from the outside in some cases.

Some protectors have a protector body, a lid member, and an engagement mechanism. The protector body has an accommodating space that accommodates a plurality of wiring members and an opening/closing opening that communicates the accommodating space and the outside with each other. The lid member is provided on the protector body and opens and closes the opening/closing opening. The engagement mechanism locks the lid member to the protector body (refer to Japanese Patent Application Laid-open No. 2021-19424, for example.)

However, the protector described above can lock the lid member to the protector body by the engagement mechanism in either case in which a plurality of wiring members are accommodated in the accommodating space in a regular arrangement or in which the wiring members are accommodated in a non-regular arrangement. As a result, there has been a risk that the wiring members accommodated in the accommodating space in the non-regular arrangement would be shipped.

SUMMARY OF THE INVENTION

The present invention is made in view of the above circumstances, and is to provide a protector a lid member of which cannot be locked to a protector body when a plurality of wiring members are accommodated in the accommodating space in a non-regular arrangement.

In order to achieve the above mentioned object, a protector according to one aspect of the present invention includes a protector body having an accommodating space that accommodates a first wiring member and a second wiring member with a larger diameter than that of the first wiring member, and an opening/closing opening that communicates the accommodating space to an outside; a lid member that is provided on the protector body and opens and closes the opening/closing opening; and an engagement mechanism that locks the lid member to the protector body, wherein the lid member has a ceiling that faces a bottom of the protector body in a closed state in which the accommodating space of the protector body is closed, and a protrusion that protrudes from the ceiling toward a side of the bottom, when the first wiring member and the second wiring member are accommodated in the accommodating space in a non-regular arrangement in which a peripheral surface of the first wiring member contacts the bottom and a peripheral surface of the second wiring member contacts the peripheral surface of the first wiring member, the peripheral surface of the second wiring member contacts the protrusion on the way of the transition of the engagement mechanism from the non-engagement state to the engagement state, and when the first wiring member and the second wiring member are accommodated in a regular arrangement in which the peripheral surface of the second wiring member contacts the bottom and the peripheral surface of the second wiring member contacts the peripheral surface of the first wiring member, the engagement mechanism transitions from the non-engagement state to the engagement state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter an embodiment of a protector according to the present invention will be described based on the drawings. Note that the embodiment does not intend to limit the present invention. Additionally, constituent elements in the following embodiment include those easily conceivable by a person skilled in the art, or those substantially identical with the constituent elements.

Embodiment

Figure 1:
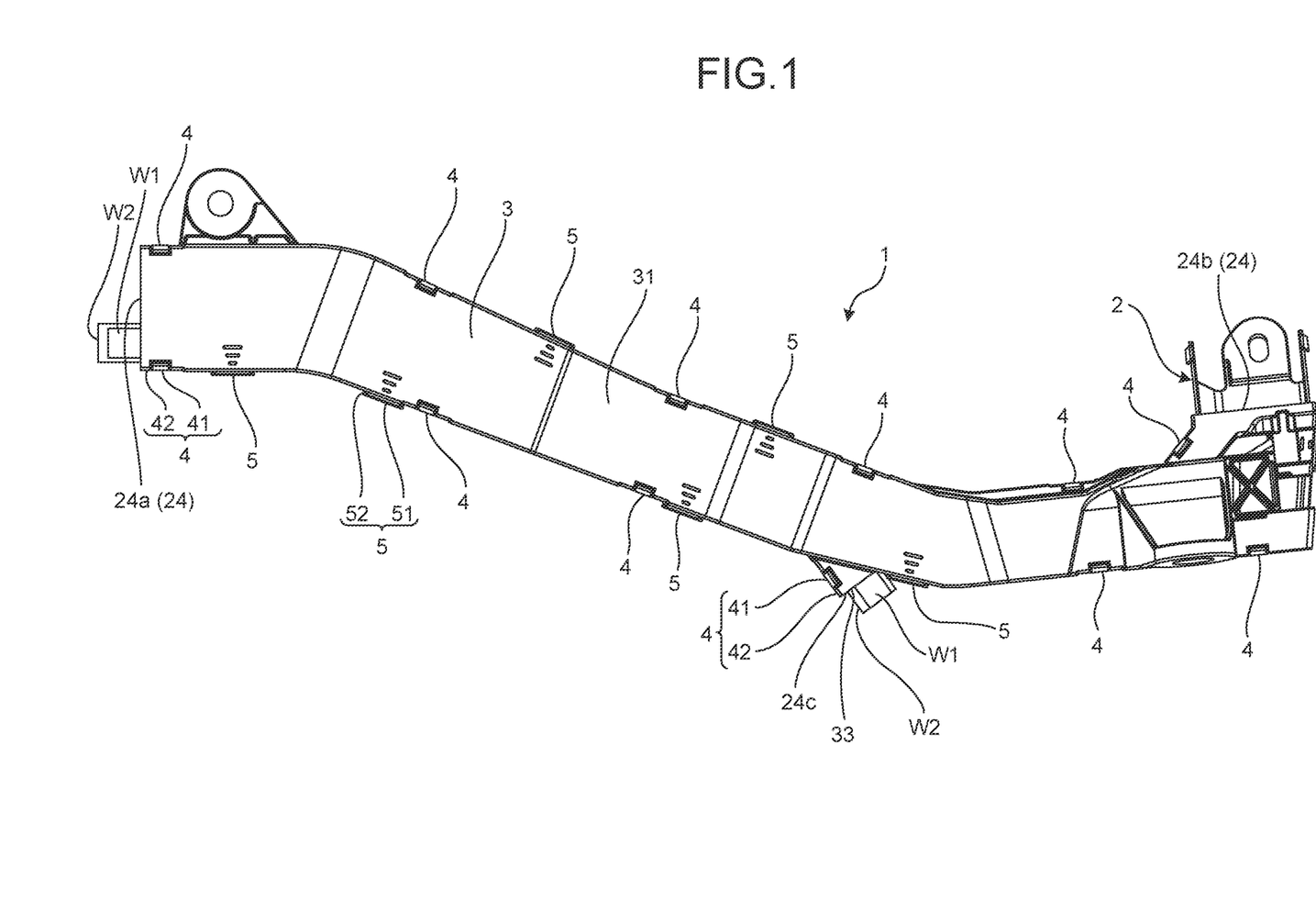
FIG. 1 is a plan view of a protector according to the present embodiment.
Figure 2:
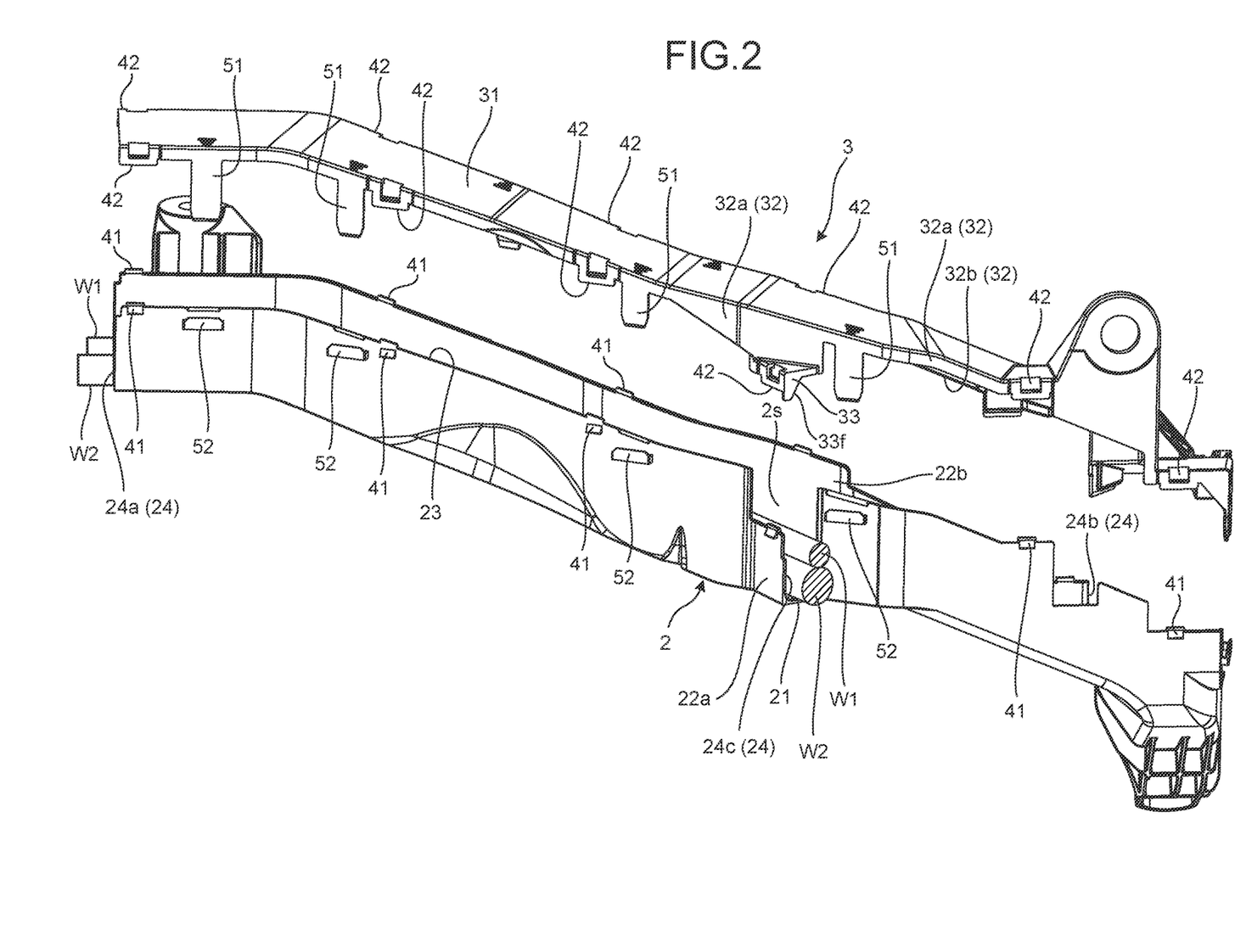
FIG. 2 is an exploded perspective view of the protector according to the present embodiment.
Figure 3:
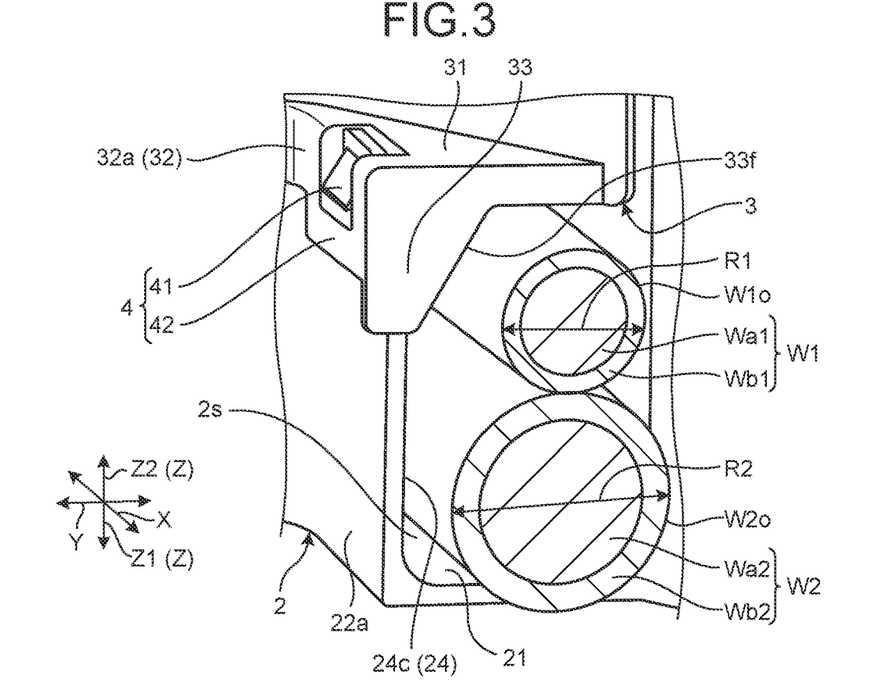
FIG. 3 is a perspective view of a state where a first wiring member and a second wiring member are accommodated in an accommodating space in a regular arrangement.
Figure 4:
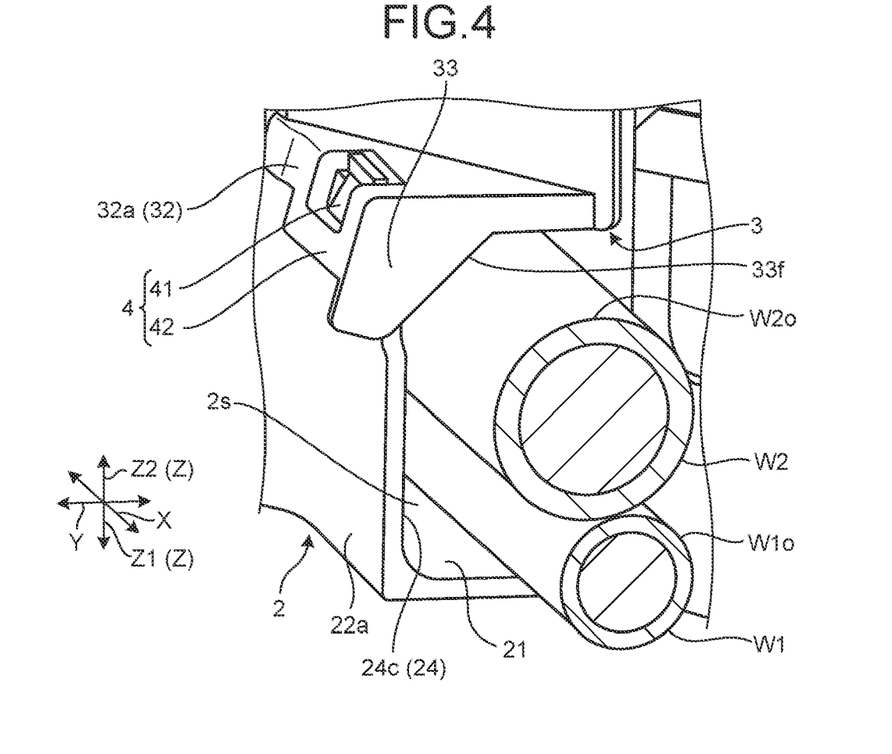
FIG. 4 is a perspective view of a state where the first wiring member and the second wiring member are arranged in the accommodating space in a non-regular arrangement.

FIG. 1 is a plan view of a protector 1 according to the present embodiment. FIG. 2 is an exploded perspective view of the protector 1 according to the present embodiment. FIG. 3 is a perspective view of a state where a first wiring member W1 and a second wiring member W2 are accommodated in an accommodating space 2s in a regular arrangement. FIG. 4 is a perspective view of a state where the first wiring member W1 and the second wiring member W2 are accommodated in the accommodating space 2s in a non-regular arrangement.

In the following description, Y is an opposite direction in which a pair of body side walls 22a and 22b in a protector body 2 face each other in the protector 1 according to the present embodiment. Z is an orthogonal direction perpendicular to the opposite direction Y, in the protector 1 according to the present embodiment. Besides, the orthogonal direction Z is a direction in which a lid member 3 is attached to and detached from the protector body 2. More specifically, one direction Z1 of the orthogonal direction Z is an assembly direction in which the lid member 3 is assembled to the protector body 2, and the other direction Z2 of the orthogonal direction Z is a removal direction in which the lid member 3 is removed from the protector body 2. Furthermore, X is an extension direction of the first wiring member W1 and an extension direction of the second wiring member W2, in the protector 1 according to the present embodiment. In the protector 1 according to the present embodiment, the extension direction X, the opposite direction Y, and the orthogonal direction Z are perpendicular to one another.

The protector 1 according to the present embodiment illustrated in FIG. 1 protects wiring members W that are incorporated in a wire harness WH1 mounted in a vehicle such as an automobile, the wiring members W being the first wiring member W1 and the second wiring member W2. For example, in order to connect various devices mounted in the vehicle, the wire harness WH1 bundles a plurality of the wiring members W used for power supply and signal communication into an assembled component, and connects the wiring members W to the devices via a connector or the like.

The wire harness WH1 according to the present embodiment includes the first wiring member W1 having a first core wire Wa1 that is conductive, a second wiring member W2 having a second core wire Wa2 that is conductive, and the protector 1 that protects the first wiring member W1 and the second wiring member W2 from the outside. The first wiring member W1 and the second wiring member W2 each include an electric wire, for example. The electric wires are products in which, for example, the outer sides of the core wires Wa1 and Wa2 that are conductors including a plurality of conductive metal strands are covered by insulating coated parts Wb1 and Wb2 (refer to FIG. 3). The first wiring member W1 has a first peripheral surface (peripheral surface) W1o as illustrated in FIG. 3. The second wiring member W2 has a second peripheral surface (peripheral surface) W2o. In addition, the wire harness WH1 may further include a connector, an electrical junction box, a grommet, a fixture, and the like. Hereinafter the configuration of the protector 1 will be described in detail with reference to the drawings.

The protector 1 is formed by an insulating synthetic resin material. The protector 1 of the present embodiment includes the first wiring member W1 and the second wiring member W2 as wiring members W to be protected. As illustrated in FIG. 3, a second diameter (diameter) R2 of the second wiring member W2 is larger than a first diameter (diameter) R1 of the first wiring member W1. The protector 1 includes the protector body 2, the lid member 3, an engagement mechanism 4, and a guide mechanism 5.

The protector body 2 is formed in a gutter shape. The protector body 2 has a bottom 21 and the pair of body side walls 22a and 22b that face each other in the opposite direction Y. The bottom 21 is formed in a flat plate shape. Each of the body side walls 22a and 22b is formed in a flat plate shape. The protector body 2 has the accommodating space 2s that accommodates the first wiring member W1 and the second wiring member W2, and an opening/closing opening 23 that communicates the accommodating space 2s and the outside with each other. The pair of body side walls 22a and 22b face each other in the opposite direction Y with the bottom 21 sandwiched therebetween. Each of the body side walls 22a and 22b protrudes from a corresponding end of the opposite direction Y in the bottom 21 toward one side of the orthogonal direction Z (more specifically, toward a removal direction Z2 side).

The opening/closing opening 23 is, for example, opened by the lid member 3 when the first wiring member W1 and the second wiring member W2 are inserted into the accommodating space 2s, and closed by the lid member 3 after the wiring member W is inserted into the accommodating space 2s. The opening/closing opening 23 is formed on one end of the orthogonal direction Z in a protector body 2. In other words, the opening/closing opening 23 is formed on the opposite side of the orthogonal direction Z from the side on which the bottom 21 is formed. In other words, the opening/closing opening 23 is formed on the removal direction Z2 side of the body side walls 22a and 22b.

Furthermore, the protector body 2 has a plurality of insertion openings 24 that communicates the accommodating space 2s with the outside and allows insertion of the first wiring member W1 and the second wiring member W2. The protector 1 according to the present embodiment has the three insertion openings 24. The protector 1 according to the present embodiment has a first insertion opening 24a and a second insertion opening 24b at both ends of the protector 1 in a length direction, and a third insertion opening 24c in a middle of the protector 1 in the length direction.

The lid member 3 illustrated in FIGS. 1 and 2 opens and closes the opening/closing opening 23. More specifically, the lid member 3 allows the accommodating space 2s of the protector body 2 to be closed by closing the opening/closing opening 23, and allows the accommodating space 2s of the protector body 2 to be open by opening the opening/closing opening 23.

The lid member 3 includes a ceiling 31, a lid side wall 32, and a protrusion 33. The ceiling 31 is formed in a flat plate shape. The lid side wall 32 is formed in a flat plate shape. A pair of the lid side walls 32 according to the present embodiment are provided on the lid member 3. More specifically, a pair of lid side walls 32a and 32b face each other in the opposite direction Y with the ceiling 31 sandwiched therebetween. Each of the lid side walls 32a and 32b protrudes from a corresponding end of the opposite direction Y of the ceiling 31 toward the other side of the orthogonal direction Z (more specifically, toward an assembly direction Z1 side).

The lid member 3, when viewed from the opposite direction Y, has the lid side walls 32a and 32b that overlap the body side walls 22a and 22b, respectively. In other words, the lid member 3 has the lid side walls 32a and 32b that overlap at least one of the pair of body side walls 22a and 22b when viewed from the opposite direction Y.

The ceiling 31 faces the bottom 21 of the protector body 2 in the closed state described above. More specifically, the ceiling 31 faces the bottom 21 of the protector body 2 in the orthogonal direction Z in the closed state described above.

The protrusion 33 protrudes from the ceiling 31 toward the bottom 21 side in the closed state described above. The protrusion 33 according to the present embodiment is formed in a flat plate shape. The protrusion 33 is provided against the third insertion opening 24c provided in the middle of the protector 1 in the length direction so as to close part of the third insertion opening 24c. The protrusion 33 connects the ceiling 31 to the lid side wall 32a. The protrusion 33 has a contact surface 33f on the bottom 21 side in the orthogonal direction Z in the closed state described above. The contact surface 33f is inclined with respect to the orthogonal direction Z from the ceiling 31 side to the bottom 21 side toward the lid side wall 32a or 32b. The protrusion 33 according to the present embodiment is formed in a substantially triangular shape with a base on the ceiling 31 side and a vertex on the bottom 21 side when viewed from the extension direction X.

The amount of protrusion of the protrusion 33 from the ceiling surface located on the accommodating space 2s side of the lid member 3 to the assembly direction Z1 side is set as follows. In other words, the amount of protrusion of the protrusion 33 is set such that, when the wiring members W are arranged in the accommodating space 2s in the regular arrangement, the contact surface 33f of the protrusion 33 and the first peripheral surface W1o of the first wiring member W1 do not contact, while when the wiring members W are arranged in the accommodating space 2s in the non-regular arrangement, the contact surface 33f of the protrusion 33 and the second peripheral surface W2o of the second wiring member W2 contact each other.

The engagement mechanism 4 locks the lid member 3 to the protector body 2. As illustrated in FIG. 2, the engagement mechanism 4 includes an engagement claw 41 and an engagement receiver 42 that is provided engageably with respect to the engagement claw 41. Furthermore, a plurality of the engagement mechanisms 4 are provided at intervals along the extension direction X of the first wiring member W1.

More specifically, for the plurality of engagement mechanisms 4 according to the present embodiment, the engagement mechanisms 4 are provided adjacent to the corresponding insertion openings 24, and a separate engagement mechanism 4 is provided between the engagement mechanisms 4 provided adjacent to the corresponding insertion openings 24.

The engagement mechanism 4 in the present embodiment is provided with an engagement claw 41 in the protector body 2, while the engagement receiver 42 is provided in the lid member 3. Besides, in the protector 1 according to the present embodiment, the engagement receiver 42 and the protrusion 33 are provided integrally. In other words, the lid member 3 according to the present embodiment has the ceiling 31, the pair of lid side walls 32a and 32b, the protrusion 33, and the engagement receiver 42, which are all integrally formed by synthetic resin material. More specifically, the protrusion 33 connects the ceiling 31 and the engagement receiver 42, and functions as a rib to improve the rigidity of the ceiling 31 and the rigidity of the engagement receiver 42.

The guide mechanism 5 has a guide claw 51 and a guide receiver 52 into which the guide claw 51 can be inserted. When assembling the lid member 3 to the protector body 2, before making the engagement claw 41 lock the engagement receiver 42, the guide mechanism 5 allows the guide claw 51 to be inserted into the guide receiver 52 and guides the engagement claw 41 toward an engagement hole of the engagement receiver 42.

Next, in the protector 1 according to the present embodiment, a case is described in which the first wiring member W1 and the second wiring member W2 are accommodated in the accommodating space 2s and the lid member 3 is locked to the protector body 2 by the engagement mechanism 4.

First, an operator inserts the first wiring member W1 into the accommodating space 2s through the opening/closing opening 23.

The operator then inserts the second wiring member W2 into the accommodating space 2s through the opening/closing opening 23. In other words, in this case, the first wiring member W1 and the second wiring member W2 are accommodated in the non-regular arrangement with respect to the accommodating space 2s.

Next, the operator inserts a tip of the guide claw 51 into the guide receiver 52, and then moves the lid member 3 toward the protector body 2 in the assembly direction Z1, bringing the engagement receiver 42 close to the engagement claw 41 in the orthogonal direction Z.

However, on the way of the transition from the non-engagement state to the engaged state, the operator is restricted to make the transition to the engagement state when the second peripheral surface W2o of the second wiring member W2 comes into contact with the protrusion 33, as illustrated in FIG. 4. In this state, for example, the engagement claw 41 of one body side wall 22b of the pair of body side walls 22a and 22b and the engagement receiver 42 of the one lid side wall 32b of the pair of lid side walls 32a and 32b are in an engagement state. On the other hand, the engagement claw 41 of one body side wall 22a of the pair of body side walls 22a and 22b and the engagement receiver 42 of the other lid side wall 32a of the pair of lid side walls 32a and 32b are in a non-engagement state. More specifically, as illustrated in FIG. 4, a semi-engagement state is made in which part of the engagement claw 41 is inserted into part of the engagement receiver 42, but the engagement claw 41 cannot be locked to the engagement receiver 42.

Therefore, when the lid member 3 cannot be locked to the protector body 2 by the engagement mechanism 4, the operator visually checks the arrangement of the plurality of wiring members W in the accommodating space 2s and the contact state between the protrusion 33 and the wiring members W at the insertion opening 24. The operator then, because the first wiring member W1 and the second wiring member W2 are not in the regular arrangement, separates the one body side wall 22a from the one lid side wall 32a in the orthogonal direction Z, and swaps the positions of the first wiring member W1 and the second wiring member W2 to accommodate the first wiring member W1 and the second wiring member W2 in the regular arrangement with respect to the accommodating space 2s.

Next, the operator brings the one body side wall 22a closer to the one lid side wall 32a in the orthogonal direction Z, and brings the engagement receiver 42 closer to the engagement claw 41.

Next, the operator inserts the engagement claw 41 into the engagement receiver 42, locks the engagement claw 41 to the engagement receiver 42, and locks the lid member 3 to the protector body 2 by the engagement mechanism 4.

The protector 1 according to the present embodiment has the following configuration. When the first wiring member W1 and the second wiring member W2 are accommodated in the accommodating space 2s in the non-regular arrangement in which the first peripheral surface W1o of the first wiring member W1 contacts the bottom 21, and the second peripheral surface W2o of the second wiring member W2 contacts the first peripheral surface W1o of the first wiring member W1, the second peripheral surface W2o of the second wiring member W2 contacts the protrusion 33 on the way of the transition of the engagement mechanism 4 from the non-engagement state to the engagement state. In addition, when the first wiring member W1 and the second wiring member W2 are accommodated in the accommodating space 2s in the regular arrangement in which the second peripheral surface W2o of the second wiring member W2 contacts the bottom 21, and the second peripheral surface W2o of the second wiring member W2 contacts the first peripheral surface W1o of the first wiring member W1, the engagement mechanism 4 transitions from the non-engagement state to the engagement state. Therefore, with the protector 1 according to the present embodiment, if the first wiring member W1 and the second wiring member W2 are in the non-regular arrangement, the engagement mechanism 4 cannot be made in the engagement state, and the operator can recognize that the plurality of wiring members W are not in the regular arrangement. Thus, the operator can arrange the engagement mechanism 4 to be in the engagement state after correcting the arrangement of the plurality of wiring members W from the non-regular arrangement to the regular arrangement. As a result, the protector 1 according to the present embodiment can provide a protector 1 in which the lid member 3 cannot be locked to the protector body 2 when a plurality of wiring members W are accommodated in the accommodating space 2s in the non-regular arrangement. Thus, the protector 1 according to the present embodiment can arrange the first wiring member W1 and the second wiring member W2 on a predetermined route, preventing one wiring member W from crossing over the other wiring member W. Therefore, the protector 1 according to the present embodiment can prevent wasted use of excess lengths preset for the first wiring member W1 and the second wiring member W2. Thus, the protector 1 according to the present embodiment can prevent the workability in electrical connection for the first wiring member W1 and the second wiring member W2 from deteriorating in a post-process.

The protector 1 according to the present embodiment has the following configuration. The protrusion 33 closes part of the insertion opening 24. Therefore, when the lid member 3 cannot be locked to the protector body 2 by the engagement mechanism 4, the operator can visually check the arrangement of the plurality of wiring members W in the accommodating space 2s and the contact state between the protrusion 33 and the wiring members W at the insertion opening 24. As a result, the operator can visually check a reason why the lid member 3 cannot be locked to the protector body 2 by the engagement mechanism 4 in the protector 1 according to the present embodiment at the insertion opening 24.

The protector 1 according to the present embodiment has the following configuration. Each of the engagement receivers 42 is provided on the lid member 3. The protrusion 33 is integrally formed with the engagement receiver 42. It is also noted that, if the engagement receiver 42 and the protrusion 33 are formed separately, there is a risk that the operator may press down on the lid member 3 with force, causing the lid member 3 to be elastically deformed and the engagement mechanism 4 to lock the lid member 3 to the protector body 2. On the other hand, the protector 1 according to the present embodiment can improve the rigidity of the lid member 3 compared to the case in which the protrusion 33 and the engagement receiver 42 are formed separately, thus suppressing elastic deformation of the lid member 3.

The protector 1 according to the present embodiment has the following configuration. Protrusion 33 connects the ceiling 31 to the lid side wall 32a. Therefore, with the protector 1 according to the present embodiment, the rigidity of the lid member 3 can be improved compared to the lid member 3 in which the protrusions 33 are not connected to the lid side walls 32a and 32b.

The protector 1 according to the present embodiment has the following configuration. The protrusion 33 has a contact surface 33f that contacts the second peripheral surface W2o of the second wiring member W2 when the first wiring member W1 and the second wiring member W2 are arranged in the accommodating space 2s in a non-regular arrangement. The contact surface 33f is inclined with respect to the orthogonal direction Z from the ceiling 31 side to the bottom 21 side toward the lid side wall 32a. It is also noted that, if the protrusion 33 has a corner on the bottom 21 side, when the operator presses the lid member 3 against the protector body 2, there is a risk that the corner of the protrusion 33 may press against the second peripheral surface W2o of the second wiring member W2, causing the second peripheral surface W2o of the second wiring member W2 to be damaged. On the other hand, the protrusion 33 of the protector 1 according to the present embodiment has a contact surface 33f that is inclined with respect to the orthogonal direction Z so as to be closer to the lid side wall 32a as the protrusion 33 approaches from the ceiling 31 side to the bottom 21 side. Therefore, even if the first wiring member W1 and the second wiring member W2 are accommodated in the accommodating space 2s in a non-regular arrangement, the above-described contact surface 33f of the protrusion 33 contacts the second peripheral surface W2o of the second wiring member W2, thus it is possible to prevent the second peripheral surface W2o of the second wiring member W2 from being damaged.

The protector 1 according to the present embodiment has the following configuration. The protector body 2 has a plurality of the insertion openings 24 that each allow the wiring member W to be inserted into the accommodating space 2s. The protrusion 33 is provided in any one of the insertion openings 24. Therefore, the protector 1 according to the present embodiment can reduce the amount of material required to form the lid member 3 compared to a protector in which each of the insertion openings 24 is provided with the protrusion 33.

The protrusion 33 in the above-described embodiment is described as a protrusion that closes part of the insertion opening 24. However, the protector 1 according to the present embodiment is not limited thereto, and may be provided with a protrusion 33 in the accommodating space 2s in the protector body 2.

The protrusion 33 according to the above-described present embodiment is described as a protrusion that is provided in the third insertion opening 24c provided in the middle of the protector 1 in the length direction. However, the protector 1 according to the present embodiment may be provided to either of the insertion openings 24a and 24b that are provided to both ends of the protector 1 in the length direction.

Furthermore, the protector 1 according to the above-described present embodiment is described as a protector in which a protrusion 33 is provided to any one of the insertion openings 24. However, the protector 1 according to the present embodiment is not limited thereto, and may be provided with a protrusion 33 in each of the insertion openings 24.

The protector 1 according to the above-described the embodiment is described as a protector in which the protector body 2 and the lid member 3 are provided separately. However, the protector 1 according to the present embodiment is not limited thereto, and the protector body 2 and the lid member 3 may be provided integrally. For example, the protector body 2 and the lid member 3 can be provided integrally with a hinge.

Furthermore, the protrusion 33 according to the above-described embodiment is described as a protrusion that connects the ceiling 31 to the lid side wall 32a. However, the protrusion 33 according to the present embodiment is not limited thereto and does not have to connect the ceiling 31 to the lid side wall 32a.

The contact surface 33f of the protrusion 33 according to the above-described embodiment is inclined with respect to the orthogonal direction Z from the ceiling 31 side to the bottom 21 side toward the one lid side wall 32a. However, the contact surface 33f of the protrusion 33 according to the present embodiment is not limited thereto, but may be provided lineally from the ceiling 31 side to the bottom 21 side.

Furthermore, the protrusion 33 according the above-described embodiment is described as a protrusion formed in a substantially triangular shape having a base on the ceiling 31 side and a vertex on the bottom 21 side, when viewed from the extension direction X. However, the shape of the protrusion 33 according to the present embodiment is not limited thereto. For example, the protrusion 33 may be formed in a rectangular shape.

Because the protector according to the present embodiment has the above configuration, it is possible to provide the protector the lid member of which cannot be locked to the protector body when the wiring members are accommodated in the accommodating space in the non-regular arrangement.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
   a protector body having an accommodating space that accommodates a first wiring member and a second wiring member with a larger diameter than that of the first wiring member, and an opening/closing opening that communicates the accommodating space to an outside;
   a lid member that is provided on the protector body and opens and closes the opening/closing opening; and
   an engagement mechanism that locks the lid member to the protector body, wherein
   the lid member has a ceiling that faces a bottom of the protector body in a closed state in which the accommodating space of the protector body is closed, and a protrusion that protrudes from the ceiling toward a side of the bottom,
   when the first wiring member and the second wiring member are accommodated in the accommodating space in a non-regular arrangement in which a peripheral surface of the first wiring member contacts the bottom and a peripheral surface of the second wiring member contacts the peripheral surface of the first wiring member, the peripheral surface of the second wiring member contacts the protrusion on the way of the transition of the engagement mechanism from the non-engagement state to the engagement state, and
   when the first wiring member and the second wiring member are accommodated in a regular arrangement in which the peripheral surface of the second wiring member contacts the bottom and the peripheral surface of the second wiring member contacts the peripheral surface of the first wiring member, the engagement mechanism transitions from the non-engagement state to the engagement state.

2. The protector according to claim 1, wherein
   the protector body has an insertion opening that communicates the accommodating space to the outside and allows insertion of the first wiring member and the second wiring member, and
   the protrusion partially closes the insertion opening.

3. The protector according to claim 2, wherein
   the engagement mechanism includes a plurality of the engagement mechanisms that are provided along an extension direction of the first wiring member at intervals between the engagement mechanisms,
   each of the engagement mechanisms includes an engagement claw and an engagement receiver that is provided engageably with respect to the engagement claw,
   the engagement receiver is provided to the lid member, and
   the protrusion is formed integrally with the engagement receiver.

4. The protector according to claim 3, wherein
   the protector body has a pair of body side walls facing each other in an opposite direction with the bottom sandwiched therebetween,
   the lid member has a lid side wall overlapping one of the pair of the body side walls when viewed from the opposite direction, and
   the protrusion connects the ceiling and the lid side wall.

5. The protector according to claim 4, wherein
   the protrusion has a contact surface that contacts the peripheral surface of the second wiring member when the first wiring member and the second wiring member are arranged in the accommodating space in a non-regular arrangement, and
   the contact surface is inclined with respect to the orthogonal direction from the ceiling side to the bottom side toward the lid side wall.

6. The protector according to claim 2, wherein
   the protector body has a pair of body side walls facing each other in an opposite direction with the bottom sandwiched therebetween,
   the lid member has a lid side wall overlapping one of the pair of the body side walls when viewed from the opposite direction, and
   the protrusion connects the ceiling and the lid side wall.

7. The protector according to claim 6, wherein
   the protrusion has a contact surface that contacts the peripheral surface of the second wiring member when the first wiring member and the second wiring member are arranged in the accommodating space in a non-regular arrangement, and
   the contact surface is inclined with respect to the orthogonal direction from the ceiling side to the bottom side toward the lid side wall.

8. The protector according to claim 1, wherein
   the engagement mechanism includes a plurality of the engagement mechanisms that are provided along an extension direction of the first wiring member at intervals between the engagement mechanisms,
   each of the engagement mechanisms includes an engagement claw and an engagement receiver that is provided engageably with respect to the engagement claw,
   the engagement receiver is provided to the lid member, and
   the protrusion is formed integrally with the engagement receiver.

9. The protector according to claim 8, wherein
   the protector body has a pair of body side walls facing each other in an opposite direction with the bottom sandwiched therebetween,
   the lid member has a lid side wall overlapping one of the pair of the body side walls when viewed from the opposite direction, and
   the protrusion connects the ceiling and the lid side wall.

10. The protector according to claim 9, wherein
    the protrusion has a contact surface that contacts the peripheral surface of the second wiring member when the first wiring member and the second wiring member are arranged in the accommodating space in a non-regular arrangement, and the contact surface is inclined with respect to the orthogonal direction from the ceiling side to the bottom side toward the lid side wall.

11. The protector according to claim 1, wherein the protector body has a pair of body side walls facing each other in an opposite direction with the bottom sandwiched therebetween, the lid member has a lid side wall overlapping one of the pair of the body side walls when viewed from the opposite direction, and the protrusion connects the ceiling and the lid side wall.

12. The protector according to claim 11, wherein the protrusion has a contact surface that contacts the peripheral surface of the second wiring member when the first wiring member and the second wiring member are arranged in the accommodating space in a non-regular arrangement, and the contact surface is inclined with respect to the orthogonal direction from the ceiling side to the bottom side toward the lid side wall.

* * * * *